March 24, 1936.    F. ALLENDORFF    2,035,417
CAGE FOR ROLLING BEARINGS
Filed July 10, 1933
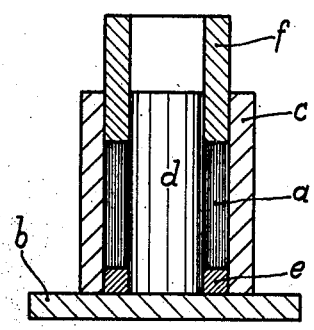
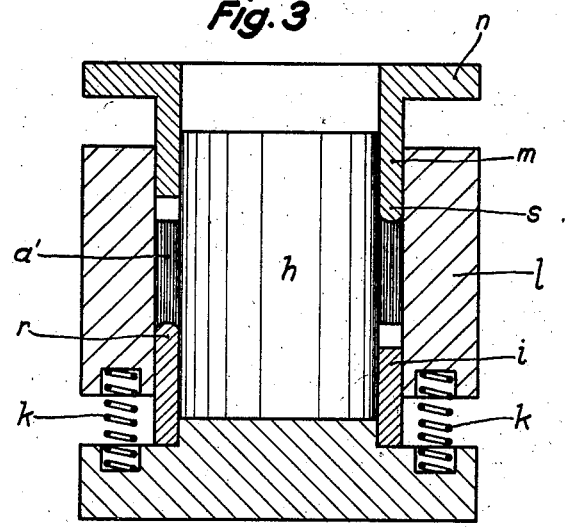
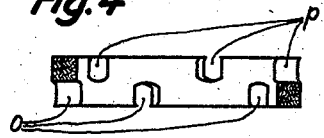
Inventor
Friedrich Allendorff
by Steward & McKay
his attorneys Patented Mar. 24, 1936

2,035,417

UNITED STATES PATENT OFFICE 2,035,417

CAGE FOR ROLLING BEARINGS

Friedrich Allendorff, Stuttgart, Germany, assignor to Robert Bosch Aktiengesellschaft, Stuttgart, Germany Application July 10, 1933, Serial No. 679,773
In Germany July 15, 1932

5 Claims. (Cl. 308—201)

The present invention relates to cages for rolling bearings formed of or including an artificial resin.

Cages for ball or roller-bearings and the like made of artificial resin to which a filler is added are already known.

According to the present invention, the cage consists of annularly wound layers of woven fabric, impregnated with artificial resin, which are compressed in an axial direction, to obtain an intimate connection of the woven layers. By this means great mechanical strength of the cage is obtained, because no tears or splits can form which would affect the durability thereof.

Various examples of construction of the invention are shown in the accompanying drawing, in which:—

Figure 1 shows a press mould.

Figure 2 a section through a finished pressed ring.

Figure 3 shows another pressing apparatus, and

Figure 4 a section through a ball-bearing cage.

Webs of fibrous material saturated or impregnated with artificial resin, for instance, cotton or linen cloth, are wound in known manner round a cylindrical mandrel or core to form a sleeve, which is indicated by $a$ in Fig. 1. This is introduced into a heated press mould, which is arranged on a press-table $b$, and consists of a hollow cylinder $c$, a cylindrical core $d$, and an annular abutment $e$. On the descent of a hollow cylindrical die $f$, the sleeve $a$ is compressed in the direction of its axis, whereby the layers are undulated. In this operation the fabric, saturated with artificial resin, quite fills the press mould, and there results at the same time a hydraulic pressure in the radial direction, by which the layers are radially compressed upon one another. Under the action of the pressure and heat the artificial resin simultaneously hardens in known manner.

In this way the layers are intimately connected together, and the pressed body obtains a considerable mechanical strength, so that tears or splits cannot occur. The great mechanical strength is especially advantageous when the pressed body is provided with recesses, as is the case in roller-bearing cages. These recesses can either be subsequently cut out of the pressed member, or simultaneouly pressed out during the compression of the member.

The undulatory displacement of the woven fabric layers after the pressing is indicated in Fig. 2. According to circumstances the displacement of the layers of fabric produced by the axial compression may also operate in a different way, for example, by the layers being folded in hook fashion.

The pressing apparatus shown in Fig. 3 has a press-table $g$ on which a cylindrical core $h$ and a lower die $i$ are arranged. A number of helical springs $k$, arranged in a ring, and the ends of which are held in blind holes, carry a matrix or die $l$ so that it stands spaced away from the table $g$ in the position of the press shown. A plate $n$ is flanged to an upper die $m$. As soon as this plate comes in contact with the upper end of the die $l$ on the descent of the upper press die, it carries the die $l$ along with it against the force of the springs $k$ until it comes against the press-table $g$.

This press is intended for an annular ball-bearing cage (Fig. 4), which is provided on both sides with recesses $o$ and $p$ for the insertion of the balls. Lugs or extensions $r$ and $s$ corresponding to the recesses are provided on the opposing ends of the two press dies $i$ and $m$, by means of which the recesses $o$ and $p$ are pressed out at the same time on the compression of the sleeve $a'$. By suitably shaping the lugs $r$, $s$ the recesses $o$ and $p$ can be made slightly conical or convergent downwards or upwards, in order to prevent the balls from dropping out of the recesses. The withdrawal of the press die presents no difficulties in this case, because the woven fabric resiliently gives on the withdrawal of the slightly conical lugs $r$, $s$. The strength and thus the durability of the ball-bearing cage is quite considerably increased by the axial compression of the sleeve on hardening.

I declare that what I claim is:

1. A cage for roller or ball bearings provided with openings for guiding the rollers or balls comprising a plurality of axially-crinkled annular layers of fabric united by a hardened artificial resin.

2. A cage for roller or ball bearings provided with openings for guiding the rollers or balls comprising axially compressed intimately connected annularly wound layers of fabric impregnated with a hardened artificial resin.

3. A cage for roller or ball bearings comprising an annular body consisting of axially-crinkled intimately-connected annularly wound layers of fabric united by a hardened artificial resin, the end faces of said body being provided with recesses for guiding the rollers or balls.

4. A cage for roller or ball bearings as claimed in claim 3 in which the recesses in one end face are staggered in relation to the recesses in the other end face.

5. A cage for roller or ball bearings as claimed in claim 3 in which the recesses are radially tapered to maintain the rollers or balls in position.

FRIEDRICH ALLENDORFF.